United States Patent [19]

Nikitin et al.

[11] 4,453,098

[45] Jun. 5, 1984

[54] COUPLING UNIT FOR CONNECTION OF HIGH-VOLTAGE GENERATOR WINDING LEAD-OUT AND CABLE

[75] Inventors: Pavel Z. Nikitin, Moscow; Yanush B. Danilevich, Leningrad; Konstantin N. Maslennikov, Novosibirsk; Pavel S. Kabanov, Moscow; Veniamin S. Turutin, Moscow; Jury F. Telezhnikov, Moscow; Konstantin F. Potekhin, Novosibirsk; Lev A. Zolotov, Moscow; Gennady A. Bezchastnov, Moscow; Tibor M. Nemeni, Moscow; Alexandr I. Nikolsky, Moscow, all of U.S.S.R.

[73] Assignee: Vsesojuzny Proektno-Izyskatelsky I. Nauchno-Issledovatelsky Institut "Gidroproekt" Imeni S.Ya. Yhuka, Moscow, U.S.S.R.

[21] Appl. No.: 403,637

[22] PCT Filed: Dec. 18, 1980

[86] PCT No.: PCT/SU80/00205

§ 371 Date: Jul. 20, 1982

§ 102(e) Date: Jul. 20, 1982

[87] PCT Pub. No.: WO82/02124

PCT Pub. Date: Jun. 24, 1982

[51] Int. Cl.³ .............................................. H02K 11/00
[52] U.S. Cl. ......................................... 310/71; 310/72
[58] Field of Search .................................... 310/71, 72

[56] References Cited

U.S. PATENT DOCUMENTS 4,390,219 6/1983 Beehler ............................ 310/71 X
4,420,701 12/1983 Nikitin et al. .................... 310/71 X Primary Examiner—Donovan F. Duggan
Attorney, Agent, or Firm—Lilling & Greenspan

[57] ABSTRACT

A coupling unit for connection of a generator high-voltage winding lead-out and a cable comprises a casing (1) wherein a generator high-voltage winding lead-out (5) with sheaths (6) and a cable termination (3) are arranged, their current carrying elements (8) being linked by a power jumper (9).

1 Claim, 1 Drawing Figure

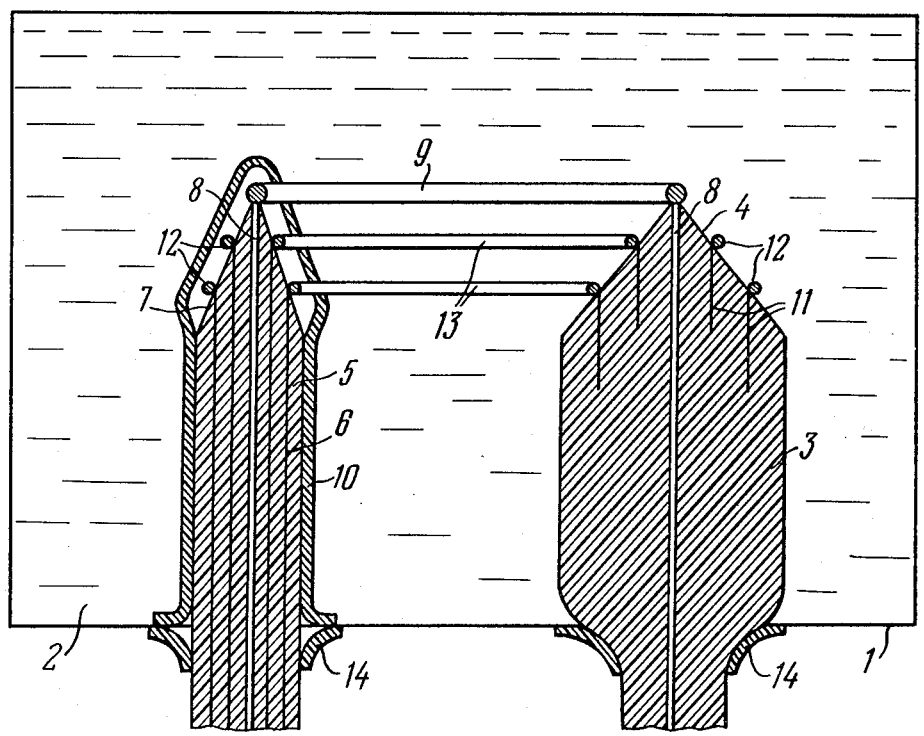

COUPLING UNIT FOR CONNECTION OF HIGH-VOLTAGE GENERATOR WINDING LEAD-OUT AND CABLE

FIELD OF THE INVENTION

The present invention relates to electrical equipment and, in particular, to cable couplings and specifically to a coupling unit for connection of a lead-out of a high-voltage generator winding and a cable.

PRIOR ART

Modern electrical engineering tends to use higher voltage in power transmission lines, transformers and generators in an attempt to increase their efficiency and minimize dimensions.

However, the use of high and superhigh voltages brings in the problem of designing coupling units for connection of various electrical elements, for example, units to couple high-voltage cables to aerial lines or cable lead-ins for transformers.

One way of coupling a high-voltage generator to other electrical devices consists in connecting an oil-filled cable of a high-voltage generator stator winding to an oil-filled cable joining the high-voltage generator to a high-voltage station or line.

The closest prototype of the present invention is a coupling unit for connection of a lead-out of a high-voltage generator winding and a cable linking said lead to external electrical apparatuses, which is made as a cable joint box (V. A. Privezetsev, E. P. Larina, Power Cables and High-Voltage Cable Lines. 1970, Energia Publ., Moscow, pp. 72–73, 77–79. (in Russian).

The known coupling unit comprises a casing filled with an insulating substance, oil, for example, wherein the cable termination featuring a capacitor splice and the lead-out of the generator high-voltage winding, featuring sheaths and a capacitor splice, are arranged, the current-carrying elements thereof being coupled to one another, both the lead-out of the generator high-voltage winding and the cable termination being encased into an insulating hermetically sealed coating.

The known coupling unit is characterized by irregular distribution of voltage throughout the surface of the splice of the cable termination which is dependent upon the capacitance between the plates of said capacitor splice and upon the capacitance between the plates of the cable termination splice and the casing.

Irregular distribution of voltage throughout the surface of the capacitor splicing of the cable termination may result in rupture of insulation whereever the intensity of the electrical field is the greatest. The capacitor splicing of the cable termination is made very long in order to eliminate the possibility of such ruptures in the known coupling unit for connection of the high-voltage generator winding and the cable, which makes the unit bulky.

DISCLOSURE OF THE INVENTION

It is an object of the present invention to provide a coupling unit for connection of a generator high-voltage winding lead-out and a cable joining the generator to external electrical apparatuses, wherein the cable termination permits reduction of the coupling unit size and higher reliability thereof.

The invention essentially resides in that in a coupling unit for connection of a generator high-voltage winding lead-out and a cable, comprising a casing filled with an insulation substance and accommodating a cable termination with a capacitor splice and a lead-out of a generator high-voltage winding, featuring sheaths and a capacitor splice, whose current carrying elements are connected to one another, the lead-out of the generator high-voltage winding being encased into an insulating hermetically sealed coating, according to the invention, the sheaths of the generator high-voltage winding lead-out are made as a system of concentric cylinders, which form at the edge of the lead-out a capacitor splice, contact rings being arranged on the surface of the capacitor splice of the generator high-voltage winding lead-out at a certain distance from one another, each such ring being connected to its sheath of the generator high-voltage winding lead-out, which has a specific electric potential, whereas the plates of the capacitor splice of the cable termination are connected to its contact rings arranged on the surface of the capacitor splice of the cable termination, each contact ring located on the capacitor splice of the generator high-voltage winding lead-out in the plane parallel to the plane extending through the beginning of this capacitor splice and at a specific uniform distance between said planes being joined by means of a strap to a contact ring located on the capacitor splice of the cable termination in the plane parallel to the plane extending through the beginning of the capacitor splice of the cable termination and at the same specific distance between latter planes, whereas the current carrying elements of the generator high-voltage winding lead-out and the cable termination are linked by means of a power jumper.

The use of the invention permits significant reduction of the dimensions of the coupling unit for connection of a generator high-voltage winding lead-out and a cable and, consequently, manufacture of high-power generators with a stator winding voltage of up to 500 kV. Besides, the use of the invention permits a substantial increase in the operational reliability of the coupling unit for connection of a generator high-voltage winding lead-out and a cable, as well as of the generator as a whole through a more effective voltage compensation throughout the surface of the capacitor splice of the cable termination.

BRIEF DESCRIPTION OF DRAWINGS

Given herein below is a detailed description of an exemplary embodiment of the present invention reference being had to the accompanying drawing illustrating a longitudinal section view of a coupling unit for connection of a generator high-voltage winding lead-out and a cable joining the generator to external electrical apparatuses, according to the invention.

BEST MODE FOR CARRYING OUT THE INVENTION

A coupling unit for connection of a generator high-voltage winding lead-out and a cable joining the generator to external electrical apparatuses comprises a casing 1 filled with an insulation substance, for example insulating oil 2. The casing 1 accommodates a termination 3 of the cable joining the generator to external electrical apparatuses, featuring a capacitor splice 4 and a lead-out 5 of the generator high-voltage winding, featuring sheaths 6 and a capacitor splice 7. The sheaths 6 of the lead-out 5 of the generator high-voltage winding are a system of concentric cylinders which form at the edge thereof the capacitor splice 7. A capacitor splice here means the fanned out bell end of the cable insulation, which forms a cone of insulation layers alternating with conducting layers, the tip of the cone being the core of the current carrying wire of the cable. Current carrying elements 8 of the termination 3 and of the lead-out 5 are linked by means of a jumper 9. The lead-out 5 of the generator high-voltage winding is encased into an insulating tight coating 10 which is intended for separation of the oil systems of the generator high-voltage winding lead-out and the cable.

Contact rings 12 are spaced a certain distance apart on the surface of the capacitor splice 7 of the lead-out 5, each ring 12 being linked with its sheath 6 of the lead-out 5 having a specific electric potential.

The capacitor splice 4 of the termination 3 of the cable joining the generator to external apparatuses is provided with plates 11 connected to the contact rings 12 arranged on the surface of the capacitor splice 4.

Each contact ring 12 located on the capacitor splice 7 of the lead-out 5 of the generator high-voltage winding in a plane running parallel to a plane extending through beginning of said capacitor splice 7 and at a specific distance between said planes is linked by means of a jumper 13 to the contact ring 12 located on the capacitor splice 4 of the termination 3 in a plane running parallel to a plane extending through the beginning of the capacitor splice 4 of the cable termination 3 and at the same distance between latter planes.

Openings in the casing 1 for letting through the cable termination and the lead-out of the generator high-voltage winding are sealed by gaskets 14.

In cable terminations operating conditions of insulation are extreme since the electric field produced at the edges of the termination is highly irregular and ruptures are a frequent occurance. In order to improve conditions of the insulation the termination is fanned out or spliced. To obtain a favourable voltage distribution along the surface of the splice, the latter should be large enough. The distribution of voltage along the surface of the capacitor splice is affected by the capacitances between the plate system of the splice, the current carrying elements of the cable termination and grounded elements of the coupling unit for connection of the generator high-voltage winding lead-out and the cable. Voltage throughout the surface of the capacitor splice can be compensated by making the splice larger.

Thus, for example, with the line voltage of 220 kV in the cable the capacitor splice is about two meters long. This entails a significant increase of the overall dimensions of the coupling unit of the generator high-voltage winding lead-out.

The jumpers 13 provided in the proposed coupling unit for connection of a generator high-voltage winding lead-out and a cable permit setting of specific voltage on the plates 11 of the capacitor splice of the termination 3 and, consequently, eliminating the effect of the capacitances between the system of plates 11 of the capacitor splice 4, the current carrying elements 8 of the cable termination 3 and grounded elements of the coupling unit for connection of a generator high-voltage winding lead-out and a cable and, moreover, arranging adjoining plates 11 at a minimum distance dictated by the electrical endurance of insulation with the given voltage drop between said plates 11. The voltage drop for any pair of adjoining plates 11 is a constant quantity defined by the potential difference of the neighbouring sheaths 6 of the generator high-voltage winding lead-out 5. Since the generator high-voltage winding is in fact a multilayer cable and each sheath 6 of the generator high-voltage winding lead-out is linked to its current carrying layer of the cable, the potential difference of the sheaths 6 is kept constant.

The herein described coupling unit for connection of a generator high-voltage winding lead-out and a cable provides an opportunity to connect the generator high-voltage winding lead-out to several cable terminations joining the generator to various power consumers with varying angles between the geometrical axis of the generator winding lead-out and the geometrical axes of the cable terminations.

The proposed invention permits a substantial reduction of the dimensions and an increase of reliability of the coupling unit for connection of a generator high-voltage winding lead-out and a cable, as well as of the generator as a whole.

INDUSTRIAL APPLICABILITY

The invention can be used in manufacturing high-power generators, including turbo generators, for thermal and nuclear power plants and heavy-duty transformers.

We claim:

1. A coupling unit for connection of a generator high-voltage winding and a cable, comprising a casing filled with an insulation substance and accommodating a cable termination with a capacitor splice and a lead-out of a generator high-voltage winding, featuring sheaths and a capacitor splice, whose current carrying elements are joined together, the lead-out of the generator high-voltage winding being encased into an insulating hermetically sealed coating, characterized in that the sheaths (6) of the generator high-voltage winding lead-out (5) are made as an array of concentric cylinders which form, at the edge of the lead-out, a capacitor splice (7), contact rings (12) being arranged on the surface of the capacitor splice (7) of the generator high-voltage winding lead-out (5) at a certain, distance from one another, each such ring (12) being connected to its sheath (6) of the generator high-voltage winding lead-out (5) which has a specific electrical potential, whereas the plates (11) of the capacitor splice (4) of the cable termination (3) are connected to their contact rings (12) arranged on the surface of the capacitor splice (4) of the cable termination (3), each contact ring (12) located on the capacitor splice (7) of the generator high-voltage winding lead-out (5) in the plane parallel to the plane extending through the beginning of said capacitor splice (7) and at a specific uniform distance between said planes being joined by a strap (13) to the contact ring (12) located on the capacitor splice (4) of the cable termination (3) in the plane parallel to the plane extending through the beginning of the capacitor splice (4) of the cable termination (3) and at the same specific distance between latter planes, whereas the current carrying elements (8) of the generator high-voltage winding lead-out (5) and the cable termination (3) are linked by a power jumper.

* * * * *